United States Patent
Daniau et al.

(10) Patent No.: US 8,813,474 B2
(45) Date of Patent: Aug. 26, 2014

(54) PULSED DETONATION ENGINE

(75) Inventors: Emeric Daniau, St Florent sur Cher (FR); François Falempin, St Arnolt (FR); Etienne Bobo, Bourges (FR); Jean-Pierre Minard, Soye en Septaine (FR)

(73) Assignee: MBDA France, Paris (FR)

( * ) Notice: Subject to any disclaimer, the term of this patent is extended or adjusted under 35 U.S.C. 154(b) by 939 days.

(21) Appl. No.: 12/995,269

(22) PCT Filed: Jun. 4, 2009

(86) PCT No.: PCT/FR2009/000649
§ 371 (c)(1),
(2), (4) Date: Nov. 30, 2010

(87) PCT Pub. No.: WO2010/000961
PCT Pub. Date: Jan. 7, 2010

(65) Prior Publication Data
US 2011/0088370 A1 Apr. 21, 2011

(30) Foreign Application Priority Data

Jun. 10, 2008 (FR) .................................. 08 03210

(51) Int. Cl.
*F23R 7/00* (2006.01)
*F02K 5/02* (2006.01)
*F02K 7/06* (2006.01)

(52) U.S. Cl.
CPC ... *F23R 7/00* (2013.01); *F02K 5/02* (2013.01); *F02K 7/06* (2013.01)

USPC .......... 60/247; 60/39.38; 60/39.78; 60/39.81; 431/1

(58) Field of Classification Search
CPC ................ F02K 7/06; F02C 5/02; F02C 5/00; F23R 7/00
USPC ................ 60/247, 39.38, 39.78, 39.81; 431/1
See application file for complete search history.

(56) References Cited

U.S. PATENT DOCUMENTS

| 4,408,984 | A | * | 10/1983 | Forster .......................... 431/354 |
| 6,213,097 | B1 | | 4/2001 | Maucher |
| 6,484,492 | B2 | * | 11/2002 | Meholic et al. ................ 60/247 |
| 6,550,251 | B1 | * | 4/2003 | Stickles et al. .................. 60/776 |
| 6,874,452 | B2 | * | 4/2005 | Adams ........................ 123/46 R |
| 7,464,534 | B2 | * | 12/2008 | Daniau ........................ 60/39.76 |

OTHER PUBLICATIONS

Written Opinion of the International Searching Authority, opinion completed Oct. 7, 2009 by the European Patent Office, for International Application No. PCT/FR2009/000649.

* cited by examiner

*Primary Examiner* — William H Rodriguez
*Assistant Examiner* — Carlos A Rivera
(74) *Attorney, Agent, or Firm* — Novak Druce Connolly Bove + Quigg LLP

(57) ABSTRACT

An engine including a means for supplying fuel to the combustion chamber of the fire tube, that includes a variable-volume transfer chamber for receiving fuel, a fuel transfer means from the tank of the engine towards the transfer chamber, and injection means for injecting fuel into the combustion chamber from the transfer chamber. The engine further includes an elastic return at least partially defined by the fuel contained in the transfer chamber.

15 Claims, 2 Drawing Sheets

PULSED DETONATION ENGINE

CROSS-REFERENCE TO RELATED APPLICATIONS

This application is a §371 national stage entry of International Application No. PCT/FR2009/000649, filed Jun. 4, 2009, which claims priority to French Patent Application 08/03210, filed Jun. 10, 2008, the entire contents of which are incorporated herein by reference.

FIELD OF THE INVENTION

The present invention relates to a pulsed detonation engine operating with a fuel-air detonating mixture.

BACKGROUND OF THE INVENTION

Such a type of engine has applications, including, but not exclusively, in the space and military aeronautic fields for equipping aircrafts, rockets, missiles, etc.

The stepping of the different phases of the operating cycle of the engine is a potentially critical point, and in particular, controlling the supply and detonation phases that could very strongly impact on the performance of such an engine.

From patent EP 1,482,162, a pulsed detonation engine is already known, having its structure that is defined by a flame tube closed at one end by a mobile transversal bottom serving as a thrust wall and on which products from the detonation of the detonating mixture are supported for generating the thrust.

In such a known pulsed detonation engine, said mobile transversal bottom alternatively travels between two limit positions and elastic return means, of the spring type, act on said bottom for thrusting it from one of said limit positions to the other as a result of the spring being compressed. Such a mobile bottom then requires operating two supply and detonation phases of the engine, through its mobility, thus closing and opening at least one intake port.

However, upon an operating cycle of the engine consisting in a forward stroke (corresponding to the compression of the spring) and a return stroke of a mobile bottom (corresponding to the latter being propelled), the spring having to face two antagonistic constraints:
- upon a forward stroke, it should be flexible (i.e. with a low stiffness) so as not to limit the motion of the mobile bottom not to penalize the speed thereof (and consequently the operating frequency of the engine) while providing a low slow down at the stroke end of the latter; and
- upon the return stroke, it should apply a maximum strength on the latter so as to reach a good speed implementation in order to limit the operating cycle time.

SUMMARY OF THE INVENTION

The object of the present invention is to improve the above mentioned pulsed detonation engine overcoming such a drawback.

To this end, according to this invention, the pulsed detonation engine operating with a fuel-air detonating mixture and comprising:
- at least one flame tube with a mobile transversal bottom with respect to the latter, so as to be able to occupy a first and a second limit position, and being closed by a transversal support being opposite to said mobile bottom;
- elastic return means acting on said mobile bottom and able, on the one hand, to propel the latter from the first position to the second one and, on the other hand, to slow the latter down at the end of the stroke from the second position to the first one;
- at least one fuel tank; and
- means for supplying fuel to the combustion chamber of said flame tube;

is remarkable:
- in that said fuel supplying means comprise:
  - a transfer chamber being variable in volume and bounded by the side wall of said flame tube, by said mobile bottom and by said transversal support and adapted for receiving fuel coming from said tank;
  - fuel transferring means being able to transfer fuel from said tank to said transfer chamber; and
  - fuel injecting means for injecting fuel into said combustion chamber from said transfer chamber;
- and in that said elastic return means comprise, at least in part, the fuel contained in said transfer chamber.

Thus, the compression of the fuel contained in the transfer chamber by the mobile bottom enables the elastic return means to progressively slow down the stroke thereof upon its travel from the second position to the first one, resulting in the speed variations and the vibrations able to be generated by such an engine being attenuated, thereby making its integration into aeronautic cells easier.

Moreover, as a result of the presence of fuel in the transfer chamber compressed by the mobile bottom, the elastic return means are able to apply a maximum strength on the mobile bottom so as to obtain a good speed implementation upon the travel of the latter from the first position to the second one. Thereby, the operating cycle time of the engine is limited.

In the case where the elastic return means only consist in the fuel in the tank stored at the gas or the liquid state, the number of mechanical members implemented upon the operation of the engine is reduced, thus improving the robustness of the structure of the engine.

Preferably, said elastic return means further comprise at least one auxiliary compression spring being able to help propelling said mobile bottom from the first position to the second one and slowing the latter down at the end of the travel from the second position to the first one.

Thus, the action of the auxiliary spring can be found useful when the pressure in the transfer chamber is not high enough for ensuring propelling and slowing down said mobile bottom.

According to another characteristic of this invention, said tank being positioned at the rear of said transversal support coaxially to said flame tube, said transversal support advantageously comprises said fuel transferring means, thus enabling a direct communication of the tank and of the transfer chamber.

Moreover, said fuel transferring means consist either in at least one pressure reducer comprising nozzles, or at least one venturi effect carburetor.

Thus, for example, in the case where the fuel is stored in the liquid state in the tank, the carburetors can enable the vaporization of the latter in the transfer chamber.

Advantageously, at least one intake port of the detonating mixture being arranged in the side wall of said flame tube:
- said mobile bottom slides between the first position and the second one, corresponding to an air supplying phase, and then to a fuel supplying phase, of the combustion chamber of said flame tube, then from the second position to the first position, corresponding to the detonation phase of the detonating mixture in said combustion chamber;

said mobile bottom has the shape of a piston with a transversal wall oriented to said combustion chamber and a side skirt cooperating with the side wall of said flame tube; and a ring is integral with the transversal wall of said piston and cooperates with the side wall of said flame tube so as to plug said intake port in the second position of said mobile bottom.

According to an embodiment according to the invention, the injection means are such that:

they comprise at least an injector provided on the side wall of said flame tube and a first hole of which opens at the level of said intake port;

at least one injection port is arranged in the side wall of said flame tube, said injection port cooperating with a second hole of said injector;

and the side skirt of said piston comprises at least one injection window, able to cooperate with said injection port, during the travel of said mobile bottom from the first position to the second one, so as to enable the injection of fuel into said combustion chamber from the transfer chamber.

Alternatively, said injection means consist in at least one check valve with a spring, housed in the transversal wall of said piston, enabling the injection of fuel in said combustion chamber during the travel of said mobile bottom from the second position to the first one.

On the other hand, the pulsed detonation engine of this invention advantageously comprises temporary blocking means for said mobile bottom when it is in the first position enabling to modify the operating frequency of said engine.

Thus, increasing the holding time of the mobile bottom in the first position, the operating frequency of the engine (and, hence, the thrust thereof) is decreased. Conversely, while limiting the retention time of the mobile bottom in the first position, a full speed operation can be achieved, the frequency of which only depends on the dynamics of the piston.

BRIEF DESCRIPTION OF THE DRAWINGS

The figures of the appended drawing will better explain how this invention can be implemented. In these figures, identical reference numerals relate to similar components.

DETAILED DESCRIPTION

Figure 1A:
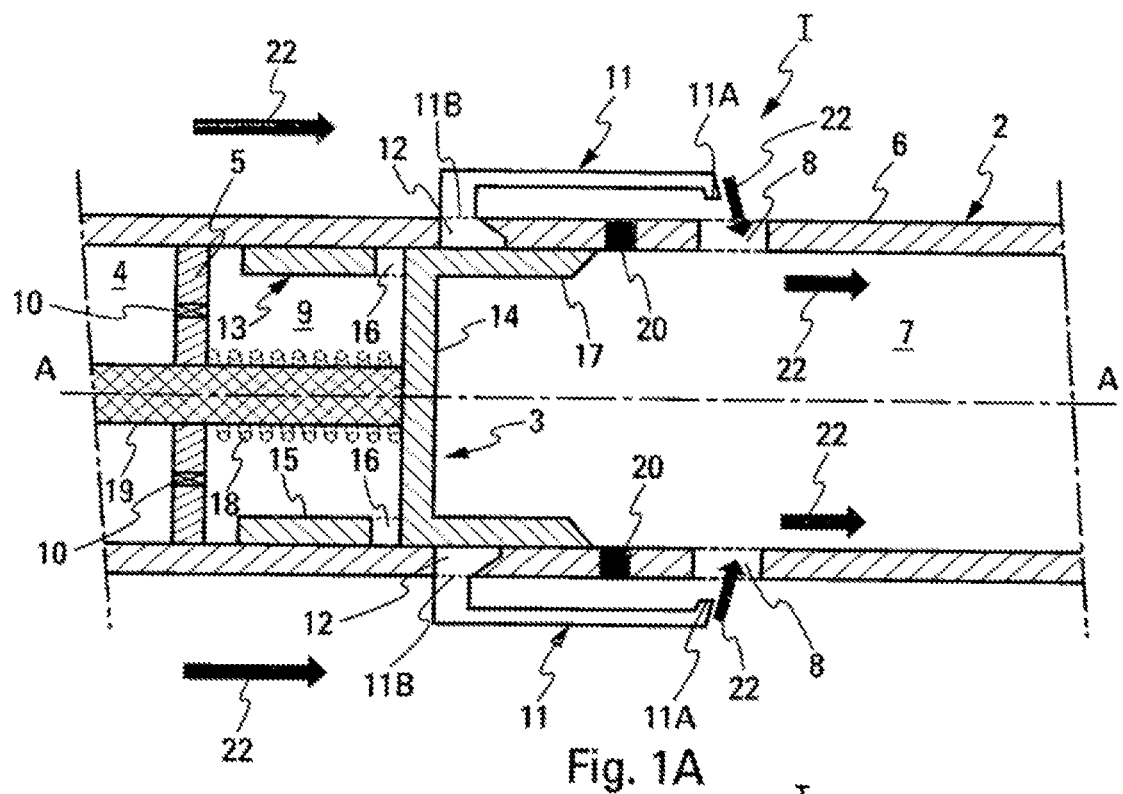
FIG. 1A is a partial schematic view in a longitudinal section of an embodiment of the pulsed detonation engine according to the present invention, showing the mobile bottom in the first limit position.
Figure 1B:
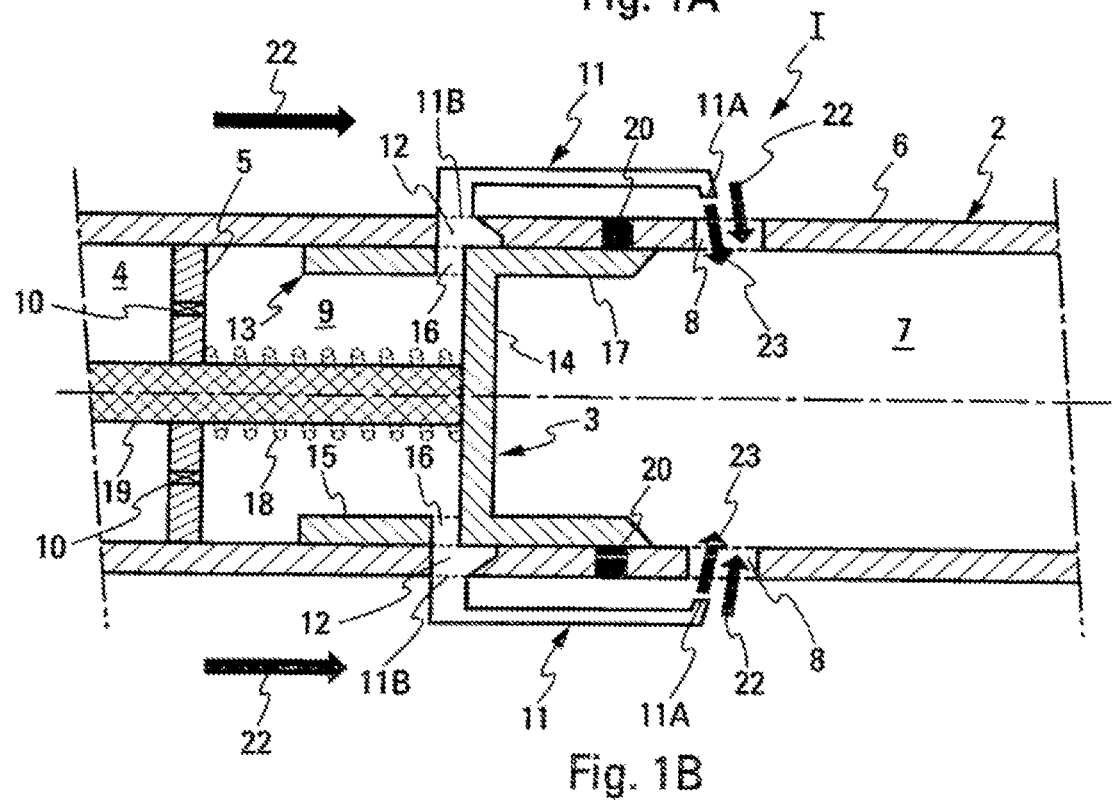
FIG. 1B is similar to FIG. 1A, the mobile bottom of the engine being in an intermediate position between the first limit position and the second one.
Figure 1C:
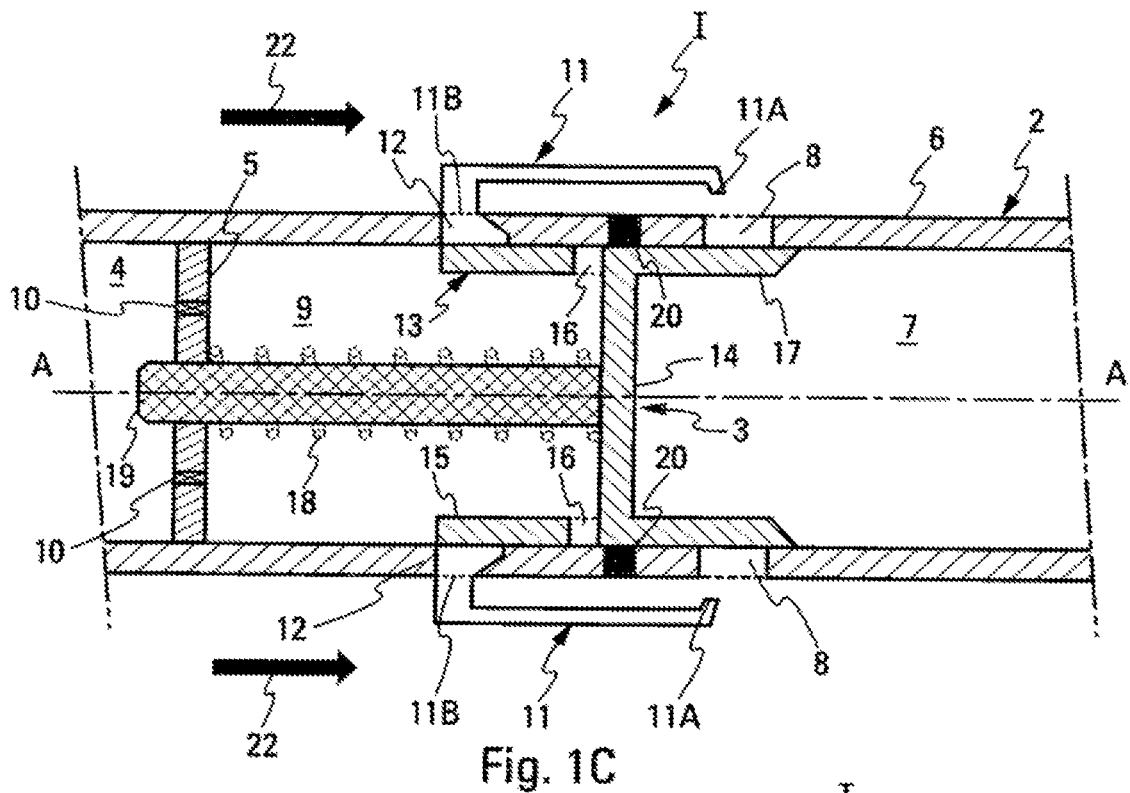
FIG. 1C is similar to FIG. 1A, the mobile bottom of the engine occupying the second limit position.

The pulsed detonation engine 1, schematically and partially shown on FIGS. 1A to 1C, comprises, in a known way, a cylindrical flame tube 2 with a longitudinal axis A, a transversal bottom 3 fittingly housed inside the flame tube 2 and a cylindrical fuel tank 4 with a longitudinal axis A (partially shown) upstream the flame tube (on the left on the figures). The flame tube 2 is separated from the fuel tank 4 by a transversal support 5.

The transversal bottom 3 bounds, with the side wall 6 of the flame tube 2, a partially illustrated combustion chamber 7 adapted to receive, on a cycle basis, a fuel load. It defines a thrust wall against which the detonation products of the fuel load apply so as to generate the thrust.

Moreover, the transversal bottom 3 is movably mounted with respect to the flame tube 2 of the engine 1 and can travel, for example, sliding between two limit positions.

According to this invention, the first limit position (FIG. 1A) corresponds to the air supply from the air inlets (not shown on the figures) of the combustion chamber 7 and the second limit position (FIG. 1C) corresponds to the detonation phase of the fuel load.

To this end, as shown on FIGS. 1A to 1C, the intake ports 8, for the intake of air and of the fuel load, are provided in the side wall 6 of the flame tube 2. Such intake ports 8 are cleared when the mobile bottom 3 occupies the first position and are plugged when it occupies the second position.

Moreover, the flame tube 2 comprises a transfer chamber 9 being variable in volume, at the rear of the mobile bottom 3, bounded by the side wall 6 of the flame tube 2 and by the transversal support 5. The transfer chamber 9 is adapted for receiving fuel from said tank 4.

Moreover, in the illustrated embodiment, the transversal support 5 comprises transfer means 10 for enabling, for example on a cycle basis, the transfer of the fuel from the tank 4 to the transfer chamber 9. Such transfer means could comprise double effect pressure reducers comprising nozzles, venturis, etc.

The pulsed detonation engine 1 further comprises injectors 11 provided on the side wall 6 of the flame tube 2. They enable fuel injection from the transfer chamber 9 to the combustion chamber 7 by means of a first hole 11A opening at the level of the intake ports 8.

In order to enable fuel injection from the transfer chamber 9 to the combustion chamber 7, injection ports 12 are provided in the side wall 6 of the flame tube 2 so as to cooperate with a second hole 11B of the injectors 11.

The mobile bottom 3 has structurally the shape of a piston 13 comprising a transversal wall 14 facing the combustion chamber 7 with a side skirt 15 cooperating, fittingly, with the side wall 6 of the flame tube 2. Injection windows 16 are arranged in the side skirt 15 of the piston 13 for enabling fuel injection from the transfer chamber 9 to the combustion chamber 7 through injectors 11. The mobile bottom 3 further comprises a ring 17 being integral with the transversal wall 14 of the piston 13 and cooperating, fittingly, with the side wall 6 of the flame tube 2 for completely plugging, on the one hand, the intake ports 8 when the mobile bottom 3 occupies the second position and, on the other hand, the injection ports 12 when the mobile bottom 3 occupies the first position.

According to this invention, elastic return means are provided in the transfer chamber 9 between the mobile bottom 3 and the transversal support 5.

Advantageously, such elastic return means consists in fuel contained in said transfer chamber 9. The counter pressure strength generated by the compression of the fuel present in the transfer chamber 9 enables, on the one hand, to slightly slow down the mobile bottom 3 at the end of the travel from the second position to the first position and, on the other hand, to propel it from its first position to its second position As shown on FIGS. 1A to 1C, they could also be coupled with an auxiliary compression spring 18 (in dashed lines on the figures) arranged between the side of the transversal wall 14 of the piston 13 and the transversal support 5 so as to facilitate propelling the mobile bottom 3 when the pressure in the transfer chamber 9 is not sufficient. A guiding rod 19 for the spring 18, fastened on the transversal wall 14 of the piston 13, is associated with said spring 18.

According to the embodiment, the engine I further comprises temporary blocking means 20 for said mobile bottom 3, when it is in the first position (FIG. 1A), so as to modify the operating frequency of the engine I. Such blocking means 20, for example housed in the side wall 6 of the flame tube 2, could be of the mechanical or the electromechanical type.

Figure 2:
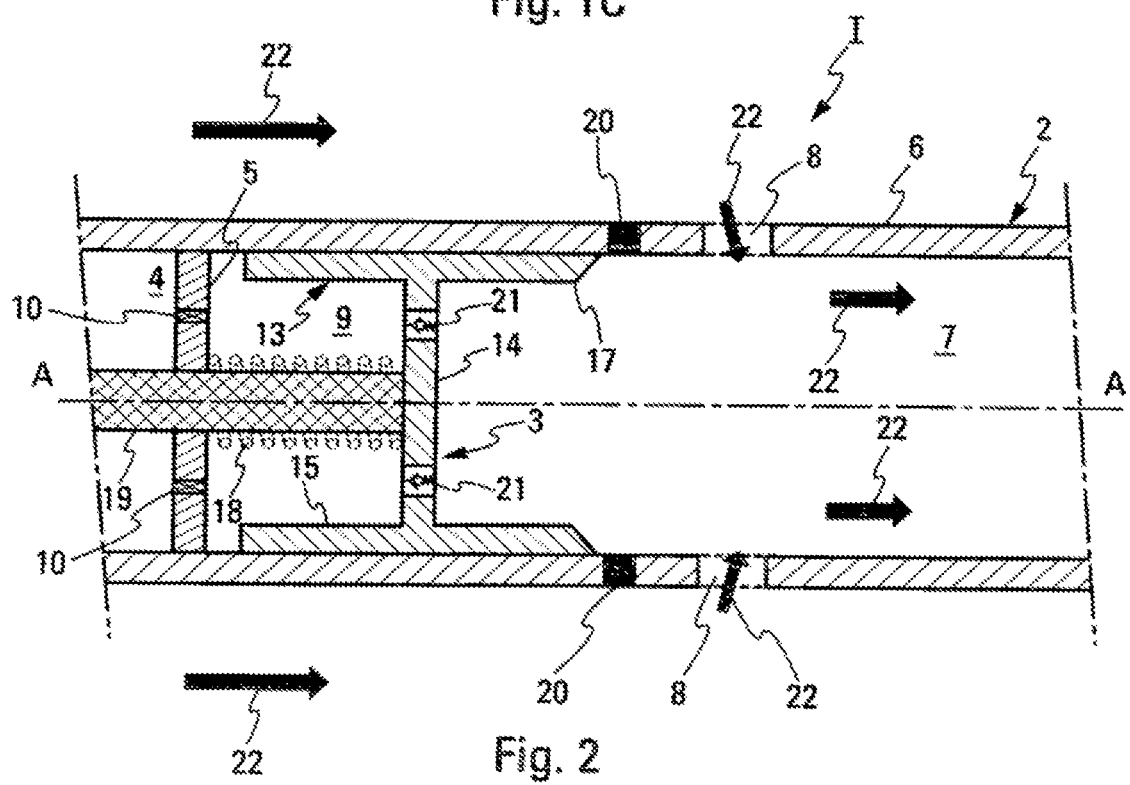
FIG. 2 is a longitudinal partial schematic view in a longitudinal section of an alternative embodiment of the pulsed detonation engine of this invention shown on FIG. 1A.

Moreover, according to another alternative embodiment illustrated on FIG. 2, the injection of fuel from the transfer chamber 9 to the combustion chamber 7 could occur by means of spring check valves 21 housed in the transversal wall 14 of the piston 13 during the travel of the mobile bottom 3 from the second to the first position.

As shown on FIG. 2, the side skirt 15 of the piston 13 does not comprise any injection window 16. Moreover, no injection port 12 is arranged in the side wall 6 of said flame tube 2.

The remainder of the structure of the engine I is similar to that previously described with relation to FIGS. 1A to 1C.

According to this invention, the pulsed detonation engine 1 could operate according to both following operating cycles:
an operating cycle in an opened intake mode; and
an operating cycle in a closed intake mode.

As shown on FIGS. 1A to 1C, the operating cycle in the opened intake mode of such a pulsed detonation engine 1 is as follows.

First of all, it is assumed that the engine I is initially in the configuration, as illustrated on FIG. 1A, for which the mobile transversal bottom 3 occupies the first position, that is:
  the injection ports 12 are plugged by the ring 17 of the mobile bottom 3;
  the injection windows 16 are plugged by the side wall 6 of the flame tube 2;
  compressed gas fuel is present in the transfer chamber 9. The pressure in the transfer chamber 9 is higher than the atmospheric pressure (Pt>Patm);
  the intake ports 8 are completely cleared, thus enabling the combustion chamber 7 to be swept by the air flow (symbolized by the arrow 22) coming from the air inlets. The pressure inside the combustion chamber 7 is equal to the atmospheric pressure (Pc=Patm); and
  the return spring 18 is compressed by the mobile transversal bottom 3.

Under the action of the return strength of the spring 18 and of the pressure in the transfer chamber 9, the mobile transversal bottom 3 is moved forward. Simultaneously, the injection windows 16 and the injection ports 12 open and cooperate mutually. The pressure difference between the transfer chamber 9 and the combustion chamber 7 results in fuel injection (symbolized by the arrow 23) in the combustion chamber 7 by the injectors 11, with the intake ports 8 being cleared.

The continuation of the forward travel of the mobile bottom 3 results in the intake ports 8 being plugged by means of the ring 17, the injection of fuel in the combustion chamber 7 ending slightly before the intake ports 8 are completely plugged.

The pressure decrease in the transfer chamber 9 (Pt<Patm) could advantageously enable a slight slow down of the mobile bottom 3 until it reaches the second position for which:
  the intake ports 8 and the injection ports 12 are completely plugged respectively by the ring 17 of the mobile bottom 3 and by the side skirt 15 of the piston 13;
  the injection windows 16 are completely plugged by the side wall 6 of the flame tube 2;
  a fuel-air detonating mixture is present in the combustion chamber 7; and
  the pressure in the combustion chamber 7 is higher than the atmospheric pressure (Pt>Patm).

When the detonation of the fuel-air mixture occurs by means of a firing device (not shown on the figures), the pressure considerably increases in the combustion chamber 7, propelling the mobile bottom 3 to the rear (on the left on FIG. 1C).

During this backward movement phase of the mobile bottom 3, pressurized gas fuel is transferred from the tank 4 to the transfer chamber 9 by means of the transfer means 10. The volume decrease in the transfer chamber 9, associated with the transfer of fuel into the latter, results in the pressure being increased in the transfer chamber 9 leading, with the action of the return strength of the spring 18, to the mobile bottom 3 being damped until it reaches again the first position (FIG. 1A).

Advantageously, the regulatory pressure of the pressure reducer could be adapted, through varying the pilot pressure or the spring gauging through a travel of a wall, so as to modify the fuel load introduced at each cycle in the transfer volume 9, thus, the injection pressure, consequently, the thrust.

A new operating cycle of the engine 1 in the opened intake mode can then begin.

In addition, the operating cycle in the opened intake mode of such a pulsed detonation engine 1 is as follows.

First of all, it is assumed that the engine I is initially in the configuration, as illustrated on FIG. 1C, for which the mobile bottom 3 occupies the previously described second limit.

It is further assumed that fuel is present in the transfer chamber 9 and that additional means enable supplying the detonation chamber with fuel.

When the detonation of the detonating mixture occurs by means of a firing device, the pressure considerably increases in the combustion chamber 7, propelling the mobile bottom 3 to the rear (on the left on FIG. 1C).

During such a backward movement phase of the mobile bottom 3, the intake ports 8 and the injection ports 12 open. Under the effect of the decrease of volume, the pressure in the transfer chamber 9 increases, resulting in the mobile bottom 3 being progressively damped. The pressure difference between the transfer chamber 9 and the combustion chamber 7 further results in fuel injection into the latter through the injectors 11. The injection stops a bit before the mobile bottom 3 reaches the first position.

Unlike the previously described opened intake mode, during the backward movement phase of the mobile bottom 3 in the closed intake mode, no transfer of fuel from the tank 4 to the transfer chamber 9 occurs, only the injection of fuel from the transfer chamber 9 to the combustion chamber 7 is achieved by means of the injectors 11 (fuel being initially present in the transfer chamber 9).

The action of the return strength of the compressed spring 18 enables sending back the mobile bottom 3 forwards (on the right on FIG. 1A). Upon this return stroke, the depression created within the transfer chamber 9 by the mobile bottom 3 results in the fuel contained in the tank 4 being drawn and being vaporized in the transfer chamber 9 by means of transfer means 10.

While getting near the second position (FIG. 1C), the mobile bottom 3 is damped and then stopped, in the second position, by the detonation of the detonating mixture being present in the combustion chamber 7, thus initiating a new operating cycle of the engine I.

In the closed intake mode, the backward movement of the mobile bottom 3 to the left provides for the injection work of fuel in the transfer chamber 9 to the combustion chamber 7.

The invention claimed is:

1. A pulsed detonation engine operating with a fuel-air detonating mixture and comprising:
   at least one flame tube with a mobile transversal bottom, so as to be able to occupy a first and a second limit position, and closed by a transversal support being opposite to said mobile transversal bottom;
   an elastic return acting on said mobile transversal bottom and being able to propel the mobile transversal bottom from the first limit position to the second limit position and to slow the mobile transversal bottom down at an end of travel from the second limit position to the first limit position;
   at least one fuel tank; and
   a fuel supplying assembly for supplying fuel to a pulsed detonation combustion chamber of said flame tube;
   wherein said fuel supplying assembly comprises:
      a transfer chamber being variable in volume, bounded by a side wall of said flame tube, by said mobile transversal bottom and by said transversal support and adapted to receive fuel from said fuel tank;
      a fuel transferring assembly being able to transfer fuel from said tank to said transfer chamber; and
      a fuel injecting assembly adapted to inject fuel into said pulsed detonation combustion chamber from said transfer chamber;
      and in that said elastic return comprise fuel contained in said transfer chamber;
      wherein said fuel tank being arranged at the rear of said transversal support coaxially to said flame tube, said transversal support comprises said fuel transferring assembly.

2. An engine according to claim 1, wherein said elastic return further comprise at least one auxiliary compression spring being able to help propelling said mobile transversal bottom from the first position to the second one and slowing down the mobile transversal bottom at the end of the travel from the second position to the first one.

3. An engine according to claim 1, wherein said fuel transferring assembly comprises at least one pressure reducer comprising nozzles.

4. An engine according to claim 1, wherein said fuel transferring assembly comprises at least one venturi effect carburetor.

5. An engine according to claim 1, wherein at least one intake port being arranged in the side wall of said flame tube:
   said mobile transversal bottom, sliding between the first limit position and the second limit position, has the shape of a piston with a transversal wall oriented to said pulsed detonation combustion chamber and a side skirt cooperating with the side wall of said flame tube; and
   wherein a ring is integral with the transversal wall of said piston and cooperates with the side wall of said flame tube so as to plug said intake port in the second limit position of said mobile transversal bottom.

6. An engine according to claim 5, wherein:
   said fuel injecting assembly comprises at least in one injector provided on the side wall of said flame tube and a first hole of which opens at a level of said intake port;
   at least one injection port is arranged in the side wall of said flame tube, said injection port cooperating with a second hole of said fuel injector;
   and the side skirt of said piston comprises at least one injection window, being able to cooperate with said injection port, upon travel of said mobile transversal bottom from the first limit position to the second limit position, so as to enable fuel injection into said pulsed detonation combustion chamber from the transfer chamber.

7. An engine according to claim 5, wherein said fuel injecting assembly comprises at least one check valve with a spring, housed in the transversal wall of said piston, enabling fuel injection into said pulsed detonation combustion chamber upon the travel of said mobile transversal bottom from the second limit position to the first limit position.

8. An engine according to claim 1, comprising a temporary blocking assembly adapted to block said mobile transversal bottom when the mobile transversal bottom is in the first limit position.

9. A pulsed detonation engine operating with a fuel-air detonating mixture and comprising:
   at least one flame tube with a mobile transversal bottom, so as to be able to occupy a first and a second limit position, and closed by a transversal support being opposite to said mobile transversal bottom;
   an elastic return acting on said mobile transversal bottom and being able to propel the mobile transversal bottom from the first limit position to the second limit position and to slow the mobile transversal bottom down at an end of travel from the second limit position to the first limit position;
   at least one fuel tank; and
   a fuel supplying assembly for supplying fuel to a pulsed detonation combustion chamber of said flame tube;
   wherein said fuel supplying assembly comprises:
      a transfer chamber being variable in volume, bounded by a side wall of said flame tube, by said mobile transversal bottom and by said transversal support and adapted to receive fuel from said fuel tank;
      a fuel transferring assembly being able to transfer fuel from said fuel tank to said transfer chamber; and
      a fuel injecting assembly adapted to inject fuel into said pulsed detonation combustion chamber from said transfer chamber;
      and in that said elastic return comprises fuel contained in said transfer chamber;
      wherein at least one intake port being arranged in the side wall of said flame tube:
         said mobile transversal bottom, sliding between the first limit position and the second limit position, has the shape of a piston with a transversal wall oriented to said pulsed detonation combustion chamber and a side skirt cooperating with the side wall of said flame tube; and
         wherein a ring is integral with the transversal wall of said piston and cooperates with the side wall of said flame tube so as to plug said intake port in the second limit position of said mobile transversal bottom.

10. An engine according to claim 9, wherein said elastic return further comprise at least one auxiliary compression spring being able to help propelling said mobile transversal bottom from the first limit position to the second limit position and slowing down the mobile transversal bottom at the end of travel from the second limit position to the first limit position.

11. An engine according to claim 9, wherein said fuel transferring assembly comprises at least one pressure reducer comprising nozzles.

12. An engine according to claim 9, wherein said fuel transferring assembly comprises at least one venturi effect carburetor.

13. An engine according to claim 9, wherein:
- said fuel injecting assembly comprises at least in one injector provided on the side wall of said flame tube and a first hole of which opens at the level of said intake port;
- at least one injection port is arranged in the side wall of said flame tube, said injection port cooperating with a second hole of said fuel injector;
- and the side skirt of said piston comprises at least one injection window, being able to cooperate with said injection port, upon the travel of said mobile transversal bottom from the first limit position to the second limit position, so as to enable fuel injection into said pulsed detonation combustion chamber from the transfer chamber.

14. An engine according to claim 9, wherein said fuel injecting assembly comprises at least one check valve with a spring, housed in the transversal wall of said piston, enabling fuel injection into said pulsed detonation combustion chamber upon the travel of said mobile transversal bottom from the second limit position to the first limit position.

15. An engine according to claim 9, comprising a temporary blocking assembly adapted to block said mobile transversal bottom when said mobile transversal bottom is in the first limit position.

* * * * *